United States Patent [19]

Hahn

[11] 3,994,532
[45] Nov. 30, 1976

[54] APPARATUS FOR REMOVING PULVERULENT MASSES FROM FOIL LINE CONTAINERS

[75] Inventor: Horst Hahn, Offenbach, Germany

[73] Assignee: Firma Gattys, Verfahrenstechnik GmbH, Germany

[22] Filed: Nov. 26, 1975

[21] Appl. No.: 635,341

[30] Foreign Application Priority Data
Nov. 29, 1974 Germany............................ 2456397

[52] U.S. Cl. .................................. 302/58; 141/67; 141/392; 222/400.7; 302/53
[51] Int. Cl.² ......................................... B65G 53/24
[58] Field of Search ............. 302/53, 58; 222/400.7; 141/67, 392

[56] References Cited
UNITED STATES PATENTS

| | | | |
|---|---|---|---|
| 2,301,617 | 11/1942 | Cox et al. ............................ | 302/58 |
| 2,950,146 | 8/1960 | Lease et al. .......................... | 302/58 |
| 3,097,017 | 7/1963 | Turner et al. ........................ | 302/58 |
| 3,147,041 | 9/1964 | Howcroft .............................. | 302/53 |

FOREIGN PATENTS OR APPLICATIONS
7,075    3/1922    Netherlands.......................... 302/58

Primary Examiner—Evon C. Blunk
Assistant Examiner—Jeffrey V. Nase
Attorney, Agent, or Firm—McGlew and Tuttle

[57] ABSTRACT

An apparatus for the pneumatic discharge of containers which are lined with a foil bag which contains a pulverulent mass comprises a tubular connection to the container having an interior sleeve portion opening into the container and providing a rotatable support for a double walled suction tube. The double walled suction tube has an interior end with a central opening into the container and an annular opening which communicates with the space between the walls and which is supplied with an air for the purpose of breaking up the pulverulent mass at the entrance to the central suction. Additional air is supplied through openings in the sleeve to the space surrounding the suction tube and the sleeve advantageously includes an insert at its inner end forming a nozzle-like divergent sections with a flow of air into the container to support the bag against collapse.

7 Claims, 1 Drawing Figure

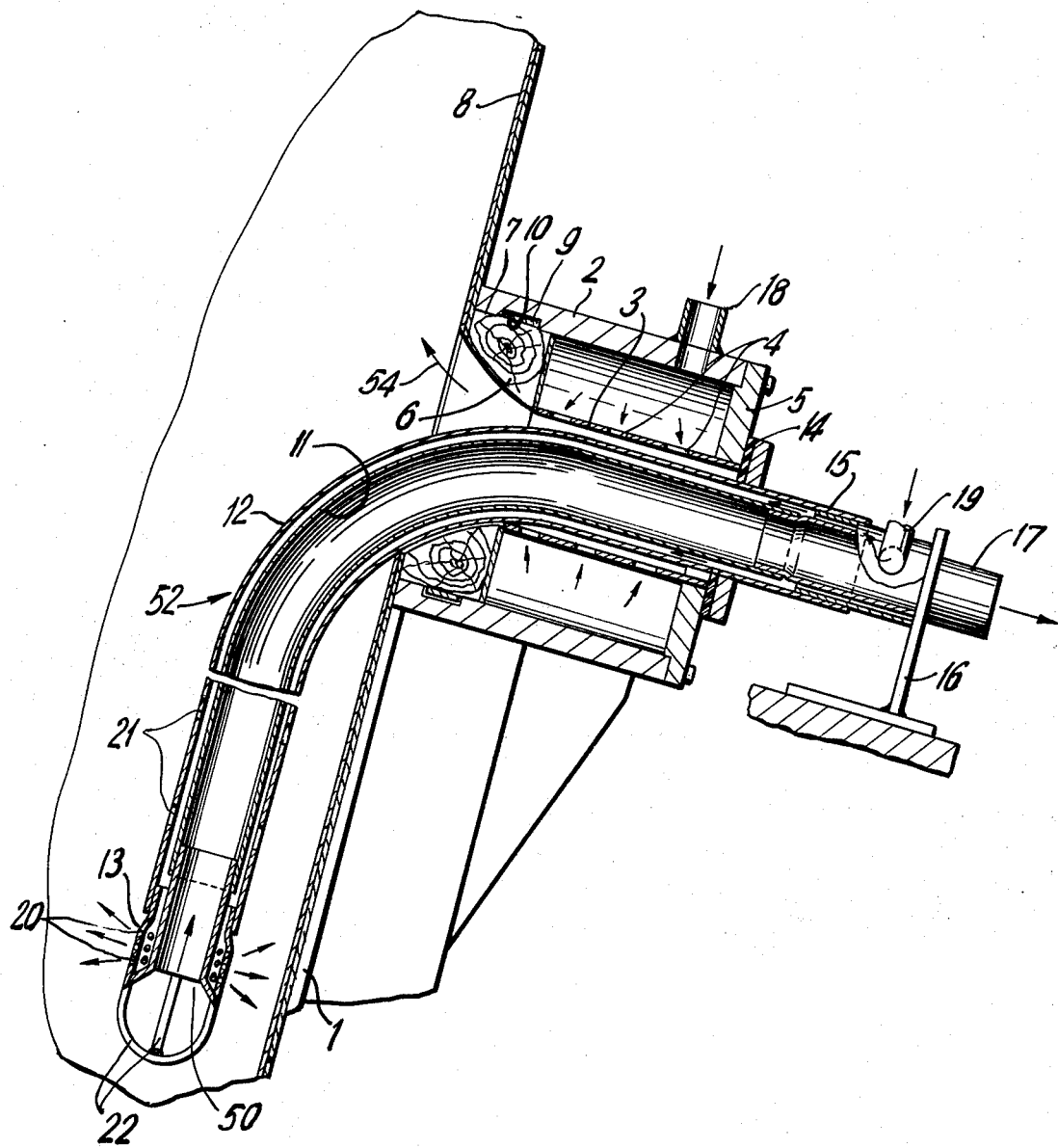

APPARATUS FOR REMOVING PULVERULENT MASSES FROM FOIL LINE CONTAINERS

BACKGROUND OF THE INVENTION

1. Field of the Invention

This invention relates in general to the construction of suction discharge devices and in particular to a new and useful apparatus for the pneumatic discharge of pulverulent masses from a container having a foil lining.

2. Description of the Prior Art

The present invention has particular application for the pneumatic discharge of receptacles or containers which have a pulverulent or a small grain mass. For discharging such masses the removal by suction must frequently be supported by suitable measures having to fluidize the mass. For this purpose it is known to rotate the container or to move it in a rocking motion during the exhaust operation so that the substance to be removed is permanently in motion. In this case it is recommendable to use a flexible suction tube so that the suction head can always be positioned at the lowermost point of the interior of the space of the container. Compressed air has also been used for loosening up the substances to be removed particularly in the vicinity of the suction head which is introduced into the container at several locations.

SUMMARY OF THE INVENTION

In accordance with the present invention applicant has provided a device particularly applicable for emptying containers which are lined with a thin foil bag and which contain a pulverulent mass therein. In order to prevent the collapse of the foil bag during the exhaust operation and the subsequent difficulties in further operation which would be caused thereby, a sufficient interior pressure is maintained within the bag as long as the operation continues.

In accordance with the invention there is provided a double walled suction tube which is introduced into the container through a tubular connection which has an interior sleeve in which the double walled tube is rotatable. The interior sleeve forms a ring nozzle having apertures for the inflow of air in an amount to maintain the foil bag within the container in an erected or inflated state without collapsing. In addition air which is necessary for loosening up the mass to be evacuated is introduced through the outer walls of the double walled suction tube and it is discharged into the interior of the container around the central suction tube opening.

According to a further feature of the invention the double-walled suction head which is attached to the inside end of the suction tube is provided with a plurality of openings distributed over the circumference of its outer wall and which provide outlets for the air supply to the annular space of the suction tube. It is also provided at its free end with a basketlike guard around the central opening which is in the form of several U-shaped bars arranged at the central opening to prevent the foil bag from becoming attached by suction to the suction tube and to prevent the suction tube from being otherwise clogged.

According to a further development of the invention the suction tube is surrounded by a sleeve in which it is rotatable and the interior end of the sleeve is provided with a curved insert forming a nozzle-like divergent wall entering into the interior of the container. The sleeve forming the ring flange is sealed against the outer wall of the tubular connection by means of an elastic gasket and it has openings in the wall at a location which is surrounded by the tubular connection so that air directed through a fitting on the tubular connection moves through the openings and is discharged around the suction tube through a nozzle entrance and into the container. The outer end of the suction tube is connected to a guide member which is also of double walled construction which has an annular space which communicates with an air supply connection at its outer end and at its inner end with the space between the walls of the double walled suction tube. The supporting structure associated with the suction tube permits it to be supported in the container at any desired location in respect to the top and bottom thereof and it may be rotated in the connection so as to shift its position.

Accordingly it is an object of the invention to provide an improved device for effecting the pneumatic discharge of a pulverulent mass from a foil lined container which includes a double walled suction member having means for passage of air through the double walls and for discharging it in the vicinity of a suction opening at the interior of the container and which also includes a connection to the container which permits the introduction of additional air between the suction tube and the walls of the connection to the interior of the container for maintaining the foil bag of the container in an erected state.

A further object of the invention is to provide a device for evacuating pulverulent mass from a container which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWINGS

In the Drawings

The only FIGURE of the drawings is a partial sectional view of a container having a device for the discharge of a pulverulent mass therefrom constructed in accordance with the invention.

GENERAL DESCRIPTION OF THE PREFERRED EMBODIMENT

Referring to the drawings in particular the invention embodied therein comprises an apparatus for the discharge of a pulverulent mass which is contained in a container 1 which is lined with a foil bag 8. For this purpose the container is provided with an opening having a tubular connection 2 surrounding the opening and provided with an interior sleeve 3 having a plurality of openings 4. The connection 2 includes a ring flange 5 providing a support for the interior sleeve 2. An insert 6 is provided with an outwardly diverging interior wall and forms a nozzle-like widening from the sleeve 3 into the interior space of the container 1. The thin foil bag 8 has a neck portion which extends into the annular gap 7 between the tubular connection 2 and the insert 6 and it is clamped in position by means of a spring ring 9 which is accommodated in an annular groove 10 of the tubular connection 2.

In accordance with a feature of the invention the apparatus includes a suction tube which is of double walled construction and includes an interior wall 11 and an exterior wall 12 having a flow space therebetween for the flow of air to effect the breaking up of the materials to be handled by the tube. The suction tube extends through the sleeve 3 and is rotatably supported therein and its inner end may be positioned in the lower part of the container 1 so as to locate a central suction opening 50 thereof in a position in which it picks up the material to be discharged. The suction tube 52 is also mounted in an elastic sealing gasket 14 and its outer end is connected to a double walled guide member 15. The guide member 15 is mounted on a fixed support 16 in a position so that it holds the suction tube in a desired location for connection to a suction line 17 which connects through the interior of the support and the guide member 15 to the interior of the suction tube 52. The suction line 17 is connected to a vacuum blower (not shown).

The apparatus includes a connection 18 for the inflow of additional air to the space between the tubular connection 2 and the sleeve 3 for flow through the openings 4 and into the interior of the container in the direction of the arrow 54. Additional air is introduced through a connection 19 to the space between the walls 11 and 12 and the annular space of the guide member 15 into a suction head 13 adjacent the suction opening 50. The air is discharged in an annular nozzle through openings 20 at locations to loosen up the substance to be discharged in the vicinity of the suction opening 50. For this same purpose additional openings 21 are also provided in the outer wall 12 of suction tube 52 at locations spaced away from the suction head 13.

The air which flows in the direction of the arrow 54 into the interior of the container is sufficient to maintain the foil bag 8 in an erected condition and prevent its collapse and engagement into the suction opening 50. As an additional precaution a basket-like guard configuration is formed by U-shaped bars 22 that extend outwardly from the opening 50 of the suction tube 52. This guard prevents a clogging of the suction opening in cases where in spite of measures for maintaining a separate interior pressure for loosening up the substance to be discharged, a portion of the foil bag 8 or a coarser still agglomerated piece of the material to be removed comes close to the opening 50.

In order to avoid a removal by suction of the substance to be discharged at the same location of the container at all times, the container is advantageously mounted for rotation or for rocking motion. During such a motion of the container, due to the flexibility and weight of the suction tube 52 it will rotate to a position at which it extends downwardly to the lowermost portion of the container. During this relative motion between the container and the suction tube the insert 6 which is made of a hard wood or plastic material or other suitable material provides as low a possible sliding friction for the tube which rests thereon.

While a specific embodiment of the invention has been shown and described in detail to illustrate the application of the principles of the invention, it will be understood that the invention may be embodied otherwise without departing from such principles.

What is claimed is:

1. An apparatus for the pneumatic discharge of containers which are lined with a foil bag and which contain a pulverulent mass, comprising a tubular connection having an interior perforated sleeve portion opening into the container, a double walled suction tube having a portion rotatable in said sleeve portion of said tubular connection and having a lower portion terminating in a central suction opening and an annular nozzle around the opening communicating with the space between the walls of said double walled suction tube, means connected to the double walled suction tube for producing a vacuum at said central suction opening, means for supplying additional air into said tubular connection and through said sleeve portion to the interior of said container for sustaining the air foil bag against collapsing, and means for supplying mass loosening air into the space between the walls of said double walled suction tube for discharge through the nozzle.

2. An apparatus according to claim 1, wherein said nozzle comprises a double walled suction head connected to said suction tube around said suction opening and having a plurality of openings distributed around its circumference providing outlets for the air supplied to the space between said double walls of said suction tube.

3. An apparatus according to claim 1, including a basket like guard extending outwardly from said suction tube around the suction opening comprising a plurality of substantially U-shaped bars providing a guard preventing the foil bag from becoming attached to the suction line.

4. An apparatus according to claim 1, wherein said tubular connection includes an outside end wall in the form of a ring flange, gasket means sealing said wall with said suction line.

5. An apparatus according to claim 4, wherein said interior sleeve portion is surrounded by the exterior of said tubular connection and defines a space therebetween for the inflow of air, said exterior tubular connection having a fitting for the inflow of air into said space.

6. An apparatus according to claim 1, including a suction tube support, a tubular guide member held by said support and extending into the interior of said suction tube at the end thereof opposite to the end in said container, said means for the supplying of air into the space between the walls of said double walled suction tube being located on said guide member.

7. An apparatus according to claim 6, wherein said guide member is of double walled construction and has an inner wall portion fitting in the interior of said suction tube and an annular space communicating with the space between the walls of said double walled suction tube, said means for applying a mass loosening air comprising a fitting on said guide tube.

* * * * *